(12) United States Patent
Derscheid (10) Patent No.: US 11,771,010 B2
(45) Date of Patent: Oct. 3, 2023

(54) ROUND BALER WITH POSITION CONTROLLED TAKE-UP ROLLER, AND METHOD OF OPERATING A ROUND BALER

(71) Applicant: DEERE & COMPANY, Moline, IL (US)

(72) Inventor: Daniel E. Derscheid, Hedrick, IA (US)

(73) Assignee: DEERE & COMPANY, Moline, IL (US)

( * ) Notice: Subject to any disclaimer, the term of this patent is extended or adjusted under 35 U.S.C. 154(b) by 351 days.

(21) Appl. No.: 16/932,883

(22) Filed: Jul. 20, 2020

(65) Prior Publication Data

US 2022/0015301 A1    Jan. 20, 2022

(51) Int. Cl.
*A01F 15/10* (2006.01)
*A01F 15/07* (2006.01)
*A01F 15/08* (2006.01)

(52) U.S. Cl.
CPC ............ *A01F 15/106* (2013.01); *A01F 15/07* (2013.01); *A01F 15/0883* (2013.01); *A01F 2015/077* (2013.01)

(58) Field of Classification Search
CPC .... A01F 15/106; A01F 15/07; A01F 15/0883; A01F 2015/077; A01F 2015/0891
See application file for complete search history.

(56) References Cited

U.S. PATENT DOCUMENTS

| 972,884 | A | * | 10/1910 | Luebben | A01F 15/07 |
| | | | | | 100/88 |
| 4,334,467 | A | | 6/1982 | Nishibe et al. | |
| 4,375,187 | A | | 3/1983 | Kluver et al. | |
| 4,391,187 | A | * | 7/1983 | Koning | A01F 15/0833 |
| | | | | | 100/88 |
| 4,393,764 | A | * | 7/1983 | Viaud | A01F 15/0883 |
| | | | | | 100/88 |

(Continued)

FOREIGN PATENT DOCUMENTS

| EP | 0130258 A1 * | 1/1985 | ............ A01F 15/07 |
| EP | 1034695 A1 | 9/2000 | |

(Continued)

OTHER PUBLICATIONS

Extended European Search Report and Written Opinion issued in European Patent Application No. 21184978.1, dated Dec. 14, 2021, in 08 pages.

*Primary Examiner* — Arpad F Kovacs (57) ABSTRACT

A round includes a housing and a gate rotatably attached to the housing for rotation about a gate rotation axis, and a forming belt that defines a variable sized baling chamber. A take-up roller supports the forming belt. A first actuator is coupled to the take-up roller and is operable to automatically apply a first bias force to the take-up roller to urge the take-up roller into a slack take-up position to reduce slack in the forming belt as the gate moves relative to the housing. A second actuator is coupled to the take-up roller for applying a second bias force to the take-up roller, in opposition to the first bias force, to restrict movement of the take-up roller into the slack take-up position to introduce slack into the forming belt when the gate is opened to an intermediate position.

18 Claims, 6 Drawing Sheets

(56) References Cited

U.S. PATENT DOCUMENTS

| | | | |
|---|---|---|---|
| 4,433,619 A * | 2/1984 | Anstey | A01F 15/07 100/88 |
| 4,491,190 A | 1/1985 | Mayfield | |
| 4,584,827 A * | 4/1986 | Merkey | A01F 15/0705 100/88 |
| 4,759,278 A * | 7/1988 | Viaud | A01F 15/07 100/88 |
| 5,115,734 A * | 5/1992 | Quartaert | A01F 15/0705 100/88 |
| 5,129,208 A * | 7/1992 | Van Zee | A01F 15/0715 53/118 |
| 5,367,865 A * | 11/1994 | Jennings | A01F 15/0833 100/88 |
| 6,457,295 B1 | 10/2002 | Arnold | |
| 6,843,170 B1 | 1/2005 | Guthmann et al. | |
| 7,024,989 B2 | 4/2006 | Preece | |
| 7,064,282 B2 | 6/2006 | Viaud et al. | |
| 7,091,425 B2 | 8/2006 | Viaud et al. | |
| 7,114,435 B2 | 10/2006 | Viaud et al. | |
| 7,140,294 B1 * | 11/2006 | Anstey | A01F 15/0883 100/88 |
| 7,703,391 B2 | 4/2010 | Duenwald et al. | |
| 9,297,688 B2 | 3/2016 | Posselius et al. | |
| 10,036,663 B2 | 7/2018 | Smith | |
| 10,813,291 B2 | 10/2020 | Kraus | |
| 11,051,456 B2 | 7/2021 | Sloan et al. | |
| 11,160,216 B2 | 11/2021 | Lebeau et al. | |
| 2004/0089483 A1 | 5/2004 | Viaud et al. | |
| 2005/0241499 A1 | 11/2005 | Viaud et al. | |
| 2007/0101874 A1 * | 5/2007 | Viaud | A01F 15/0833 100/88 |
| 2010/0326294 A1 * | 12/2010 | Smith | A01F 15/0833 100/88 |
| 2016/0165801 A1 | 6/2016 | Posselius et al. | |
| 2019/0141901 A1 * | 5/2019 | Hackert | A01F 15/085 53/582 |

FOREIGN PATENT DOCUMENTS

| | | | | |
|---|---|---|---|---|
| EP | 1446998 B1 | 8/2009 | | |
| EP | 2100498 A2 | 9/2009 | | |
| EP | 2661953 A1 * | 11/2013 | | A01F 15/07 |
| EP | 3174380 B1 | 12/2018 | | |
| EP | 3266299 B1 | 3/2019 | | |
| EP | 3677113 A1 | 7/2020 | | |
| FR | 2621446 A1 | 4/1989 | | A01F 15/07 |
| WO | WO-9703550 A1 * | 2/1997 | | A01F 15/07 |
| WO | WO-2014194287 A2 * | 12/2014 | | A01F 15/07 |
| WO | WO-2021001456 A1 * | 1/2021 | | A01F 15/0833 |

* cited by examiner

ROUND BALER WITH POSITION CONTROLLED TAKE-UP ROLLER, AND METHOD OF OPERATING A ROUND BALER

TECHNICAL FIELD

The disclosure generally relates to a round baler and a method of controlling a round baler.

BACKGROUND

There are a wide variety of different types of machines that generate bales of material. Such balers can bale material like hay, straw, silage, cotton, recycled paper products, etc. One type of machine produces a bale having a cylindrical shape. Such a machine is often referred to as a round baler. One configuration of round baler includes a plurality of forming belts forming a baling chamber and running in an endless loop about a plurality of rollers. Some of the rollers are repositioned during the formation of the bale to increase the size of the baling chamber to accommodate larger diameters. A round baler of this configuration is often referred to as a variable chamber round baler.

It is not uncommon for operators to wish to know the weight of each bale. There are a variety of different reasons for this. For instance, the weight of the bale may be indicative of the moisture level of the baled material. The operator may wish to know this so that he or she can regulate the baling process based on the moisture content in a bale. Similarly, bales are often moved away from a field where they are harvested by loading them onto a transport vehicle. The transport vehicles are often rated to carry only a certain weight. Thus, knowing the weight of the bale can help in ensuring that the rated transport vehicle load is not exceeded. Further, bales may be sold based on weight.

In order to address this issue, various weight measurement systems have been implemented in round balers. An example weight measurement system calculates the weight of the bale based on measured forces acting on a hydraulic cylinder supporting the bale and a rear gate of the round baler. The measurement of the forces acting on the hydraulic cylinder is taken with the gate partially opened, i.e., in an intermediate position, and with the gate supporting the bale. Movement of the gate is temporarily paused in the intermediate position to measure the forces acting on the hydraulic cylinder.

The discussion above is merely provided for general background information and is not intended to be used as an aid in determining the scope of the claimed subject matter.

SUMMARY

A round baler is provided. The round baler includes a housing, and a gate rotatably attached to the housing. The gate is rotatable relative to the housing about a gate rotation axis between a closed position and an open position. A forming belt defines a baling chamber and is operable to form crop material within the baling chamber into a bale having a cylindrical shape. A take-up roller is moveably coupled to one of the gate or the housing. The take-up roller supports the forming belt. A first actuator is coupled to the take-up roller and is operable to automatically apply a first bias force to the take-up roller. The first bias force urges the take-up roller into a slack take-up position to reduce slack in the forming belt as the gate moves relative to the housing, between the open position and the closed position. A second actuator is coupled to the take-up roller and is operable to apply a second bias force to the take-up roller. The second bias force is applied in opposition to the first bias force to control movement of the take-up roller as the gate moves relative to the housing.

In one aspect of the disclosure, a take-up shaft is attached to the take-up roller. the take-up shaft defines a shaft axis. The take-up roller and the take-up shaft are rotatable about the shaft axis. In one example embodiment, the take-up shaft is rotatably attached to the gate. In another example embodiment, the take-up shaft is rotatably attached to the housing.

In one aspect of the disclosure, a roller lever is attached to and rotatable with the take-up shaft about the shaft axis. The roller lever interconnects the take-up shaft and the take-up roller. The take-up lever positions the take-up roller away from the shaft axis of the take-up shaft, such that the take-up roller moves in an arcuate path as the take-up roller rotates about the shaft axis.

In one aspect of the disclosure, the first actuator and the second actuator are coupled to the take-up shaft. In one example embodiment, an actuator lever interconnects the take-up shaft and the first actuator. The actuator lever may further interconnect the take-up shaft and the second actuator. In another embodiment, a second actuator lever may interconnect the take-up shaft and the second actuator. The first actuator and/or the second actuator may be attached to the actuator lever at a distance spaced from the shaft axis, such that the first bias force from the first actuator and/or the second bias force from the second actuator generate a torque about the shaft axis to urge rotation of the take-up shaft and the take-up roller about the shaft axis.

In one example implementation of the round baler, the first actuator includes a spring, such as but not limited to a coil spring. In one example implementation, the second actuator includes a linear actuator selectively controllable to extend and retract along a linear path. For example, the second actuator may include, but is not limited to, a hydraulic cylinder having a first end coupled to the take-up roller and a second end coupled to one of the housing or the gate.

In one aspect of the disclosure, the round baler may include a baler controller. The baler controller includes a processor and a memory having a gate control algorithm saved thereon. The processor is operable to execute the gate control algorithm to control the second actuator. The baler controller controls the second actuator to act in opposition to the first actuator when the gate moves from the closed position to an intermediate position. The intermediate position is disposed between the closed position and the open position. In response to the second actuator being controlled to act in opposition to the first actuator, the forming belt exhibits a first amount of tension for a period of time while the gate is disposed in the intermediate position. When the forming belt exhibits the first amount of tension, the forming belt does not rotate through an endless loop, and is not drawn taught so as to not push the bale out of the gate. Be leaving the first amount of tension in the forming belt when the gate is in the intermediate position, the bale may be retained in the gate to allow the forces acting on hydraulic gate cylinders to be measured, which may then be used to calculate the weight of the bale.

In one aspect of the disclosure, when the gate moves between the closed position and the intermediate position, the processor is operable to execute the gate control algorithm to control the second actuator to generate the second bias force to include a magnitude sufficient to overcome the first bias force from the first actuator. When the second bias force from the second actuator is sufficient to overcome the first bias force from the first actuator, the take-up roller remains in a bale formation position, and does not move into the slack take-up position, thereby introducing the first amount of tension into the forming belt as the gate moves from the closed position into the intermediate position.

In one aspect of the disclosure, the processor is operable to execute the gate control algorithm to control the second actuator to maintain the second bias force at the magnitude sufficient to overcome the first bias force from the first actuator for the period of time the gate is disposed in the intermediate position.

In one aspect of the disclosure, after the period to time, the processor is operable to execute the gate control algorithm to control the second actuator to allow the first bias force from the first actuator to move the take-up roller into the slack take-up position, such that the forming belt exhibits a second amount of tension that is less than the first amount of tension. For example, the processor may be operable to execute the gate control algorithm to control the second actuator to generate the second bias force to include a magnitude less than the first bias force from the first actuator when the gate moves between the intermediate position and the open position.

A method of controlling a round baler is provided. The round baler includes a variable size baling chamber for forming a bale having a cylindrical shape. The method includes forming crop material into a bale having a cylindrical shape with a forming belt circulating in an endless loop about a plurality of rollers. At least one of the plurality of rollers is a take-up roller operable to decrease slack in the forming belt when a gate of the round baler is opened. At least one of the plurality of rollers is a drive roller operable to drive the forming belt in the endless loop through frictional engagement between the forming belt and the drive roller. When formation of the bale is complete within the baling chamber, the gate of the round baler is then moved relative to a housing of the round baler from a closed position into an intermediate position. As the gate moves from the closed position into the intermediate position, a first bias force from a first actuator urging the take-up roller into a slack take-up position is counteracted with a second bias force from a second actuator to introduce a first amount of tension in the forming belt. The first amount of tension in the forming belt generates amount of friction or friction force between the drive roller and the forming belt insufficient to maintain movement of the forming belt in the endless loop around the plurality of rollers.

In one aspect of the method of controlling the round baler, the gate is maintained in the intermediate position with the first amount of tension in the forming belt for a period of time. After the period of time, the gate is moved relative to the housing from the intermediate position into an open position.

In one aspect of the disclosure, after the period of time, the second bias force from the second actuator is reduced to allow the first bias force from the first actuator to move the take-up roller into the slack take-up position such that the forming belt exhibits a second amount of tension. The second amount of tension in the forming belt generates amount of friction, i.e., a friction force, between the drive roller and the forming belt sufficient to maintain movement of the forming belt in the endless loop around the plurality of rollers.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Referring to the Figures, wherein like numerals indicate like parts throughout the several views, a round baler is generally shown at 20. Referring to the Figures, the round baler 20 includes a frame 22. One or more ground engaging elements 24, such as but not limited to one or more wheels and/or tracks, are attached to and rotatably supported by the frame 22. A tongue 26 may be coupled to the frame 22 at a forward end 28 of the frame 22. A hitch arrangement 30 may be included with the tongue 26. The hitch arrangement 30 may be used to attach the round baler 20 to a traction unit, such as but not limited to an agricultural tractor. In other embodiments, the round baler 20 may be self-propelled, in which case the traction unit and the round baler 20 are configured as a single, self-propelled vehicle.

The round baler 20 includes a housing 32. The housing 32 is attached to and supported by the frame 22. The housing 32 may include one or more wads or panels that at least partially enclose and/or define an interior region 34. The round baler 20 further includes a gate 36. The gate 36 may include one or more walls or panels that at least partially enclose and/or define the interior region 34. As such, the housing 32 and the gate 36 cooperate to define the interior region 34 therebetween.

The gate 36 is attached to and rotatably supported by the housing 32. The gate 36 is positioned adjacent a rearward end 38 of the frame 22 relative to a direction of travel 40 of the round baler 20 while gathering crop material, and is pivotably moveable about a gate rotation axis 42. The gate rotation axis 42 is generally horizontal and perpendicular to a central longitudinal axis 44 of the frame 22. The central longitudinal axis 44 of the round baler 20 extends between the forward end 28 and the rearward end 38 of the round baler 20. The gate 36 is moveable between a closed position (shown in FIG. 2) for forming a bale 56 within the interior region 34, and an open position (shown in FIG. 4) for discharging the bale 56 from the interior region 34 onto a ground surface 46. The gate 36 may further be moveable to at least one intermediate position (shown in FIG. 3), which is disposed between the closed position and the open position.

The round baler 20 includes a pick-up 48 disposed proximate the forward end 28 of the frame 22. The pick-up 48 gathers crop material from the ground surface 46 and directs the gathered crop material toward and into an inlet 50 of the interior region 34. The pickup may include, but is not limited to tines, forks, augers, conveyors, baffles, etc., for gathering and moving the crop material. The round baler 20 may be equipped with a pre-cutter (not shown), disposed between the pickup and the inlet 50. As such, the pre-cutter is disposed downstream of the pickup and upstream of the inlet 50 relative to movement of the crop material. As is understood by those skilled in the art, the pre-cutter cuts or chops the crop material into smaller pieces.

Figure 5:
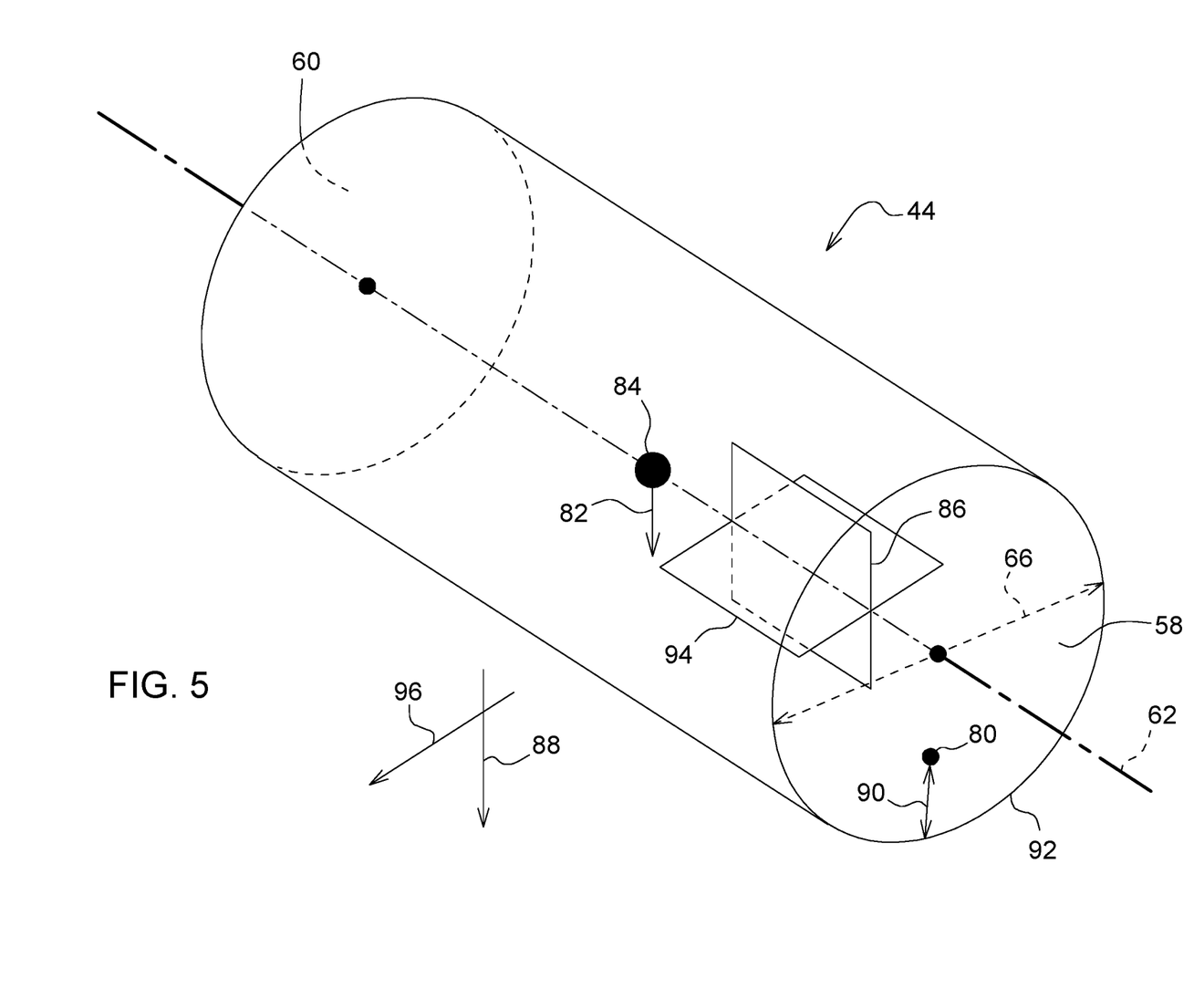
FIG. 5 is a schematic perspective view of a bale.

A bale formation system 52 is disposed within the interior region 34 and defines a baling chamber 54, within which a bale 56 is formed. The bale formation system 52 is operable to form the bale 56 to have a cylindrical shape. Referring to FIG. 5, the cylindrical shape of the bale 56 includes a first circular end face 58 and a second circular end face 60 disposed at opposing ends of the bale 56 relative to a centerline 62 of the cylindrical shape. The centerline 62 of the bale 56 is generally located and extends through respective diametric centers of the first circular end face 58 and the second circular end face 60. The centerline 62 of the cylindrical shape is generally parallel with the gate rotation axis 42 and perpendicular to the central longitudinal axis 44 during formation of the bale 56 by the bale formation system 52, within the baling chamber 54.

Figure 1:
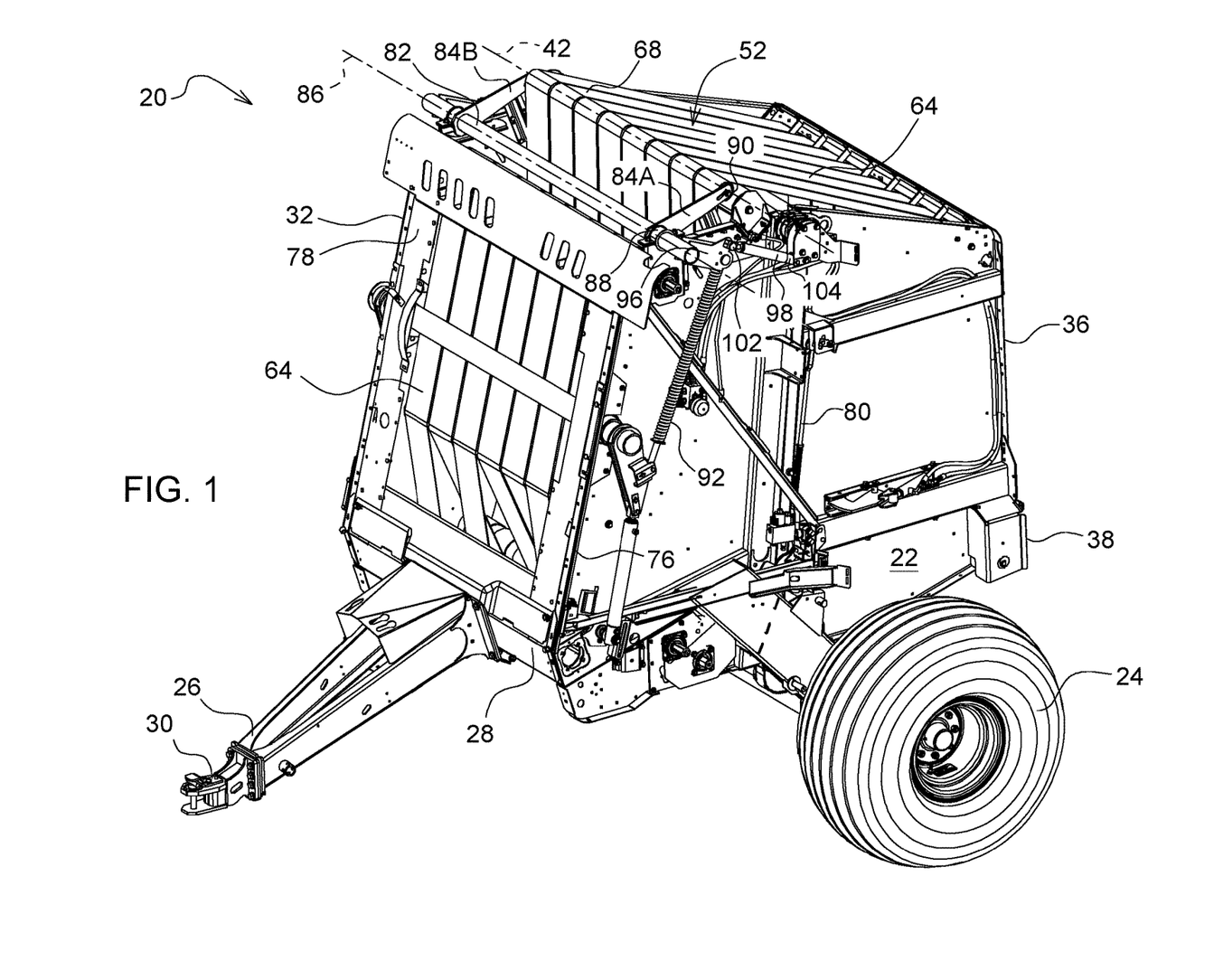
FIG. 1 is a schematic perspective view of a round baler showing a gate in a closed position and a take-up roller in a bale formation position.
Figure 2:
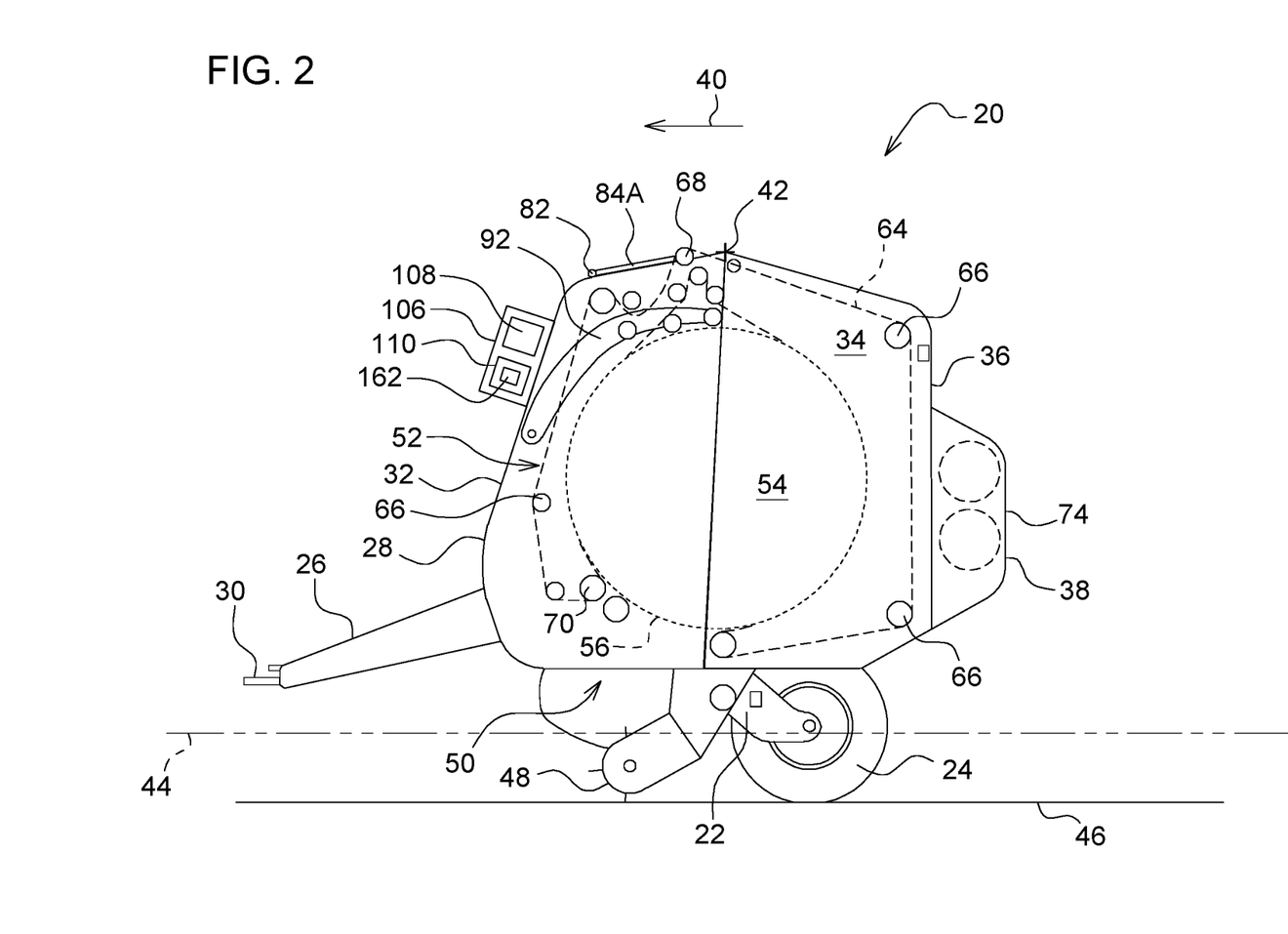
FIG. 2 is a schematic side view of the round baler showing the gate in a closed position and the take-up roller in the bale formation position.

The bale formation system 52 may be configured as a variable chamber baler. Referring to FIGS. 1 and 2, and as is understood by those skilled in the art, the variable chamber baler includes at least one, and may include a plurality of longitudinally extending side-by-side forming belts 64 that are supported by a plurality of rollers 66. The forming belts 64 define the baling chamber 54 and move in an endless loop to form crop material into the bale 56 having the cylindrical shape. The bale 56 is formed by the forming belts 64 and one or more side walls of the housing 32 and gate 36. As is understood by those skilled in the art, the forming belts 64 are controlled to vary the diametric size of the baling chamber 54.

The plurality of rollers 66 support the forming belts 64. At least one of the rollers 66 is a take-up roller 68. The take-up roller 68 is moveably coupled to one of the gate 36 or the housing 32, and is operable or moveable to decrease slack in the forming belts 64 when the gate 36 of the round baler 20 is opened. Additionally, at least one of the plurality of rollers 66 may include a drive roller 70 that is operable to drive the forming belts 64 in the endless loop through frictional engagement between the forming belts 64 and the drive roller 70.

In the example implementation shown in the figures and described herein, in which the bale formation system 52 includes the variable chamber baler, the crop material is directed through the inlet 50 and into the baling chamber 54, whereby the forming belts 64 roll the crop material in a spiral fashion into the bale 56 having the cylindrical shape. The belts apply a constant pressure to the crop material as the crop material is formed into the bale 56. A belt tensioner 72 continuously moves one or more of the rollers 66, and thereby the forming belts 64. radially outward relative to the centerline 62 of the cylindrical bale 56 as a diameter of the bale 56 increases. The belt tensioner 72 maintains the appropriate tension in the belts to obtain the desired density of the crop material.

As shown in FIG. 2, the round baler 20 may include a wrap system 74. The wrap system 74 is operable to wrap the bale 56 with a wrap material inside the baling chamber 54. Once the bale 56 is formed to a desired size, the wrap system 74 feeds the wrap material into the baling chamber 54 to wrap the bale 56 and thereby secure the crop material in a tight package and maintain the desired shape of the bale 56. The wrap material may include, but is not limited to, a twine, a net mesh, or a solid plastic wrap. Movement of the gate 36 into the open position simultaneously moves the belts clear of the formed bale 56 and allows the formed and wrapped bale 56 to be discharged through the rearward end 38 of the baling chamber 54.

Referring to FIG. 1, the housing 32 includes a first side wall 76 positioned generally parallel with the first circular end face 58 of the bale 56 during formation of the bale 56 in the bale formation system 52. The housing 32 includes a second side wall 78 is positioned generally parallel with the second circular end face 60 of the bale 56 during formation of the bale 56 in the bale formation system 52. It should be appreciated that the first circular end face 58 and the first side wall 76 may be positioned on either the left side or the right side of the round baler 20, relative to the direction of travel 40 of the round baler 20 while gathering crop material, with the second circular end face 60 and the second side wall 78 positioned on the other of the left side or the right side of the round baler 20, opposite the first circular end face 58 and the first side wall 76.

Figure 3:
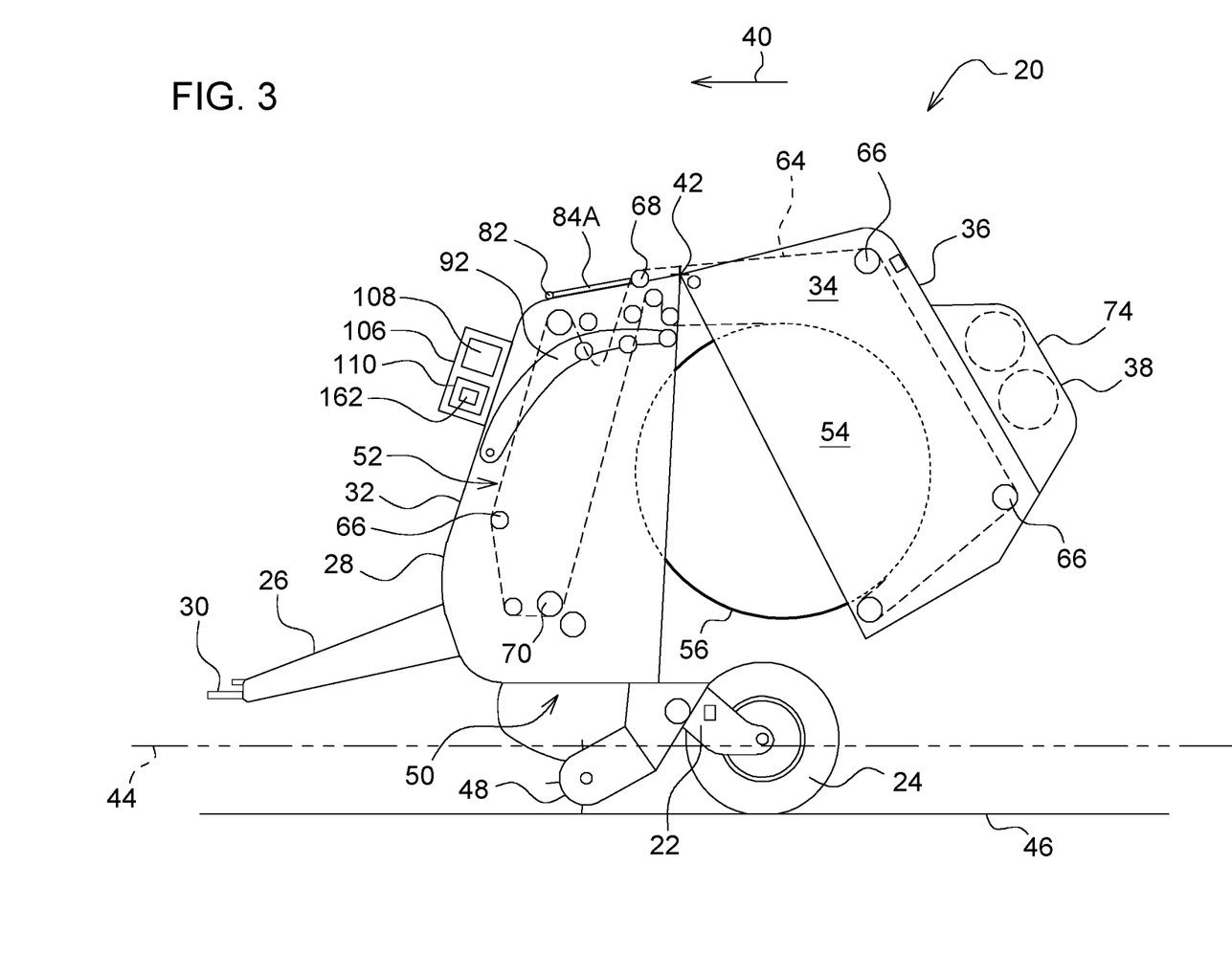
FIG. 3 is a schematic side view of the round baler showing the gate in the intermediate position, the take-up roller in the bale formation position, and a forming belt of the round baler exhibiting a first amount of slack.

In some circumstances and/or for some baling operations, it is desirable to measure or otherwise determine a weight of the bale 56 after formation and before being discharged from the interior region 34 of the round baler 20 and onto the ground surface 46. One process of determining the weight of the bale 56 is to fully support the bale 56 on the gate 36, and measure the force applied to one or more hydraulic gate cylinders 80 holding the gate 36 and the bale 56 in the intermediate position. In order to do so, the bale 56 and the gate 36 may be moved to the intermediate position, such that the weight of the bale 56 is fully supported by the gate 36. Referring to FIG. 3, in the intermediate position, one or more pressure or force sensors (not shown) may sense data related to the forces acting on the hydraulic cylinders holding the gate 36 in the intermediate position. Knowing theses forces and the weight and geometry of the gate 36, the weight of the bale 56 may be accurately calculated. In order to accurately make this calculation, however, the bale 56 should be consistently positioned relative to the gate 36. In order to consistently position the bale 56 on the gate 36 in the intermediate position, the rotation of the forming belts 64 in the endless loop may need to be stopped so that the forming belts 64 do not rotate the bale 56 when in the intermediate position. Additionally, tension in the forming belts 64 may need to be reduced, i.e., slack introduced into the forming belts 64, so that the forming belts 64 do not discharge the bale 56 from the gate 36 when in the intermediate position.

Referring to FIG. 1, the take-up roller 68 may be moveably attached to either the gate 36 or the housing 32 in a suitable manner that allows the take-up roller 68 to move relative to the gate 36 and/or the housing 32 as the gate 36 moves between the open position and the closed position, so that the take-up roller 68 maintains tension and/or reduces slack in the forming belts 64 as the gate 36 moves from the closed position into the open position. As used herein, the term "tension" is defined as a force that tends to produce an elongation of a body or structure. As used herein, the term "slack" is defined as looseness in the forming belts 64, i.e., not taut. It should be appreciated that increasing tension of the forming belts 64 reduces slack in the forming belts 64, whereas decreasing tension in the forming belts 64 introduces slack into the forming belts 64.

In the example implementation shown in the Figures and described herein, the take-up roller 68 is attached to the gate 36 via a take-up shaft 82 and an interconnecting roller lever 84. However, it should be appreciated that the take-up roller 68 may be attached to the gate 36 or the housing 32 in some other manner not shown in the Figures or described herein. The take-up shaft 82 extends between the first side wall 76 and the second side wall 78 of the housing 32. The take-up shaft 82 defines a shaft axis 86. The shaft axis 86 is a longitudinal center of the take-up shaft 82, and generally extends perpendicular to the central longitudinal axis 44 of the round baler 20. The shaft axis 86 is generally parallel with the gate rotation axis 42. The take-up roller 68 is attached to the take-up shaft 82, with the take-up roller 68 rotatable with the take-up shaft 82 about the shaft axis 86, relative to the gate 36 and/or the housing 32. In the example implementation shown in the Figures and described herein, the take-up shaft 82 is rotatably attached to the gate 36. However, in other implementations, the take-up shaft 82 may be rotatably attached to the housing 32.

The roller lever 84 is attached to and rotatable with the take-up shaft 82 about the shaft axis 86. The roller lever 84 interconnects the take-up shaft 82 and the take-up roller 68. While only a single roller lever 84 is described herein, it should be appreciated that the round baler 20 may include multiple roller lever 84s interconnecting the take-up shaft 82 and the take-up roller 68. For example, in the implementation shown in the Figures, a first roller lever 84A is disposed adjacent the first side wall 76 of the housing 33, and a second roller lever 84B is disposed adjacent the second side wall 78 of the housing 32. A first end 88 of the roller lever 84 is fixedly attached to the take-up shaft 82. The take-up roller 68 is rotatably mounted to a second end 90 of the roller lever 84, such as with a bearing or other similar mounting. The roller lever 84 positions the take-up roller 68 away from the shaft axis 86 by a radial distance.

Figure 6:
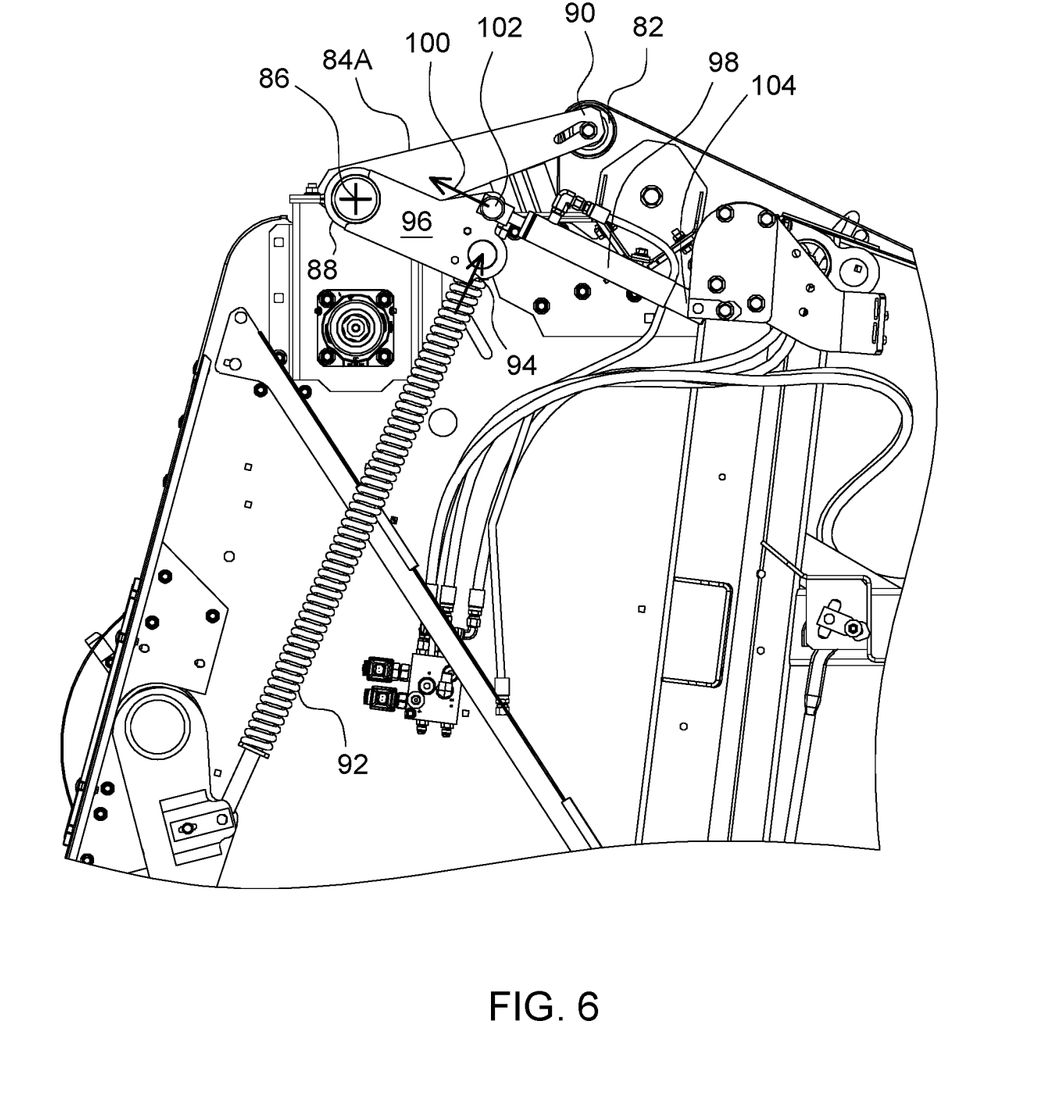
FIG. 6 is a schematic fragmentary side plane view of the round baler.

As best shown in FIG. 6, a first actuator 92 is coupled to the take-up roller 68. The first actuator 92 may be configured and coupled to the take-up roller 68 in a manner that enables the first actuator 92 to automatically apply a first bias force 94 to the take-up roller 68 to urge the take-up roller 68 into a slack take-up position to increase tension and/or reduce slack in the forming belt 64 as the gate 36 moves relative to the housing 32 from the closed position into the open position. In the example implementation shown in the Figures and described herein, the first actuator 92 is coupled to the take-up shaft 82 via an actuator lever 96, the take-up shaft 82 being connected to the take-up roller 68. By the interaction between the actuator lever 96, the take-up shaft 82, and the roller lever 84, the first actuator 92 is coupled to the take-up roller 68. However, it should be appreciated that the first actuator 92 may be coupled to the take-up roller 68 in some other manner not described herein.

In the example implementation shown in the Figures and described herein, the first actuator 92 is attached to the actuator lever 96 a distance from the shaft axis 86. A force applied to the actuator lever 96 by the first actuator 92, i.e., the first bias force 94, generates a torque in the take-up shaft 82, which if not restrained rotates the take-up shaft 82 about the shaft axis 86 thereby moving the take-up roller 68. In the example implementation described herein, the first actuator 92 includes a spring, such as but not limited to a coil spring. As the gate 36 moves from the closed position toward the open position, the first actuator 92 expands urging the take-up roller 68 into the slack take-up position.

As best shown in FIG. 6, a second actuator 98 is also coupled to the take-up roller 68. The second actuator 98 may be configured and coupled to the take-up roller 68 in a manner that enables the second actuator 98 to selectively apply a second bias force 100 to the take-up roller 68. The second bias force 100 is applied in opposition to the first bias force 94 to control movement of the take-up roller 68 as the gate 36 moves relative to the housing 32. In the example implementation shown in the Figures and described herein, the second actuator 98 is coupled to the take-up shaft 82 via the actuator lever 96, the take-up shaft 82 being connected to the take-up roller 68. By the interaction between the actuator lever 96, the take-up shaft 82, and the roller lever 84, the second actuator 98 is coupled to the take-up roller 68. However, it should be appreciated that the second actuator 98 may be coupled to the take-up roller 68 in some other manner not described herein.

In the example implementation shown in the Figures and described herein, the second actuator 98 is attached to the actuator lever 96 a distance from the shaft axis 86. A force, i.e., the second bias force 100, applied to the actuator lever 96 by the second actuator 98 generates a torque in the take-up shaft 82, which if of sufficient magnitude, counteracts and/or overcomes torque generated by the first actuator 92, thereby preventing or limiting rotation of the take-up shaft 82 about the shaft axis 86, and preventing or limiting movement of the take-up roller 68 into the slack take-up position as the gate 36 moves relative to the housing 32. In the example implementation described herein, the second actuator 98 includes a linear actuator that is selectively controllable to extend and retract along a linear path. The linear actuator may include, but is not limited to, a hydraulic cylinder, a pneumatic cylinder, an electric motor, or some other device capable of extending and retracting in response to a control signal. In the example implementation described herein, the second actuator 98 includes a hydraulic cylinder having a first end 102 coupled to the take-up roller 68 via the interaction between the actuator lever 96, the take-up shaft 82, and the roller lever 84, and a second end 104 coupled to one of the housing 32 or the gate 36. The second actuator 98 is operable in response to an applied hydraulic control signal to selectively extend or retract.

The round baler 20 further includes a baler controller 106. As used herein, the term "controller" is intended to be used consistent with how the term is used by a person of skill in the art, and refers to a computing component with processing, memory 110, and communication capabilities, which is utilized to execute instructions (i.e., stored on the memory 110 or received via the communication capabilities) to control or communicate with one or more other components. In certain embodiments, the baler controller 106 may also be referred to as a control unit, a control module, vehicle control unit, baler control unit, electrical controller, computer, computing device, etc. In certain embodiments, the baler controller 106 may be configured to receive input signals in various formats (e.g., hydraulic signals, voltage signals, current signals, CAN messages, optical signals, radio signals, etc.), and to output command or communication signals in various formats (e.g., hydraulic signals, voltage signals, current signals, CAN messages, optical signals, radio signals, etc.).

The baler controller 106 may be in communication with other components on the round baler 20 or other associated vehicles, such as hydraulic components (e.g., a valve block), electrical components (e.g., a solenoid, a sensor, etc.), and operator inputs. The baler controller 106 may be electrically connected to these other components by a wiring harness such that messages, commands, and electrical power may be transmitted between the baler controller 106 and the other components. Although the baler controller 106 is referenced in the singular, in alternative implementations the configuration and functionality described herein can be split across multiple controllers 66 using techniques known to a person of ordinary skill in the art.

The baler controller 106 is operable to control the operation of at least the second actuator 98 The baler controller 106 includes a processor 108, a memory 110, and all software, hardware, algorithms, connections, sensors, etc., necessary to manage and control the operation of the second actuator 98 As such, a method may be embodied as a program or algorithm operable on the baler controller 106. It should be appreciated that the baler controller 106 may include any device capable of analyzing data from various sensors, comparing data, making the necessary decisions required to control the operation of the second actuator 98 and executing the required tasks necessary to control the operation of the second actuator 98

The baler controller 106 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (ND) circuitry, digital-to-analog (D/A) circuitry, and any required input/output (I/O) circuitry, I/O devices, and communication interfaces, as well as signal conditioning and buffer electronics.

The computer-readable memory 110 may include any non-transitory/tangible medium which participates in providing data or computer-readable instructions. The memory 110 may be non-volatile or volatile. Non-volatile media may include, for example, optical or magnetic disks and other persistent memory. Example volatile media may include dynamic random access memory (DRAM), which may constitute a main memory. Other examples of embodiments for the memory may include a floppy, flexible disk, or hard disk, magnetic tape or other magnetic medium, a CD-ROM, DVD, and/or any other optical medium, as well as other possible memory devices such as flash memory.

As described above, the baler controller 106 includes the tangible, non-transitory memory 110 on which are recorded computer-executable instructions, including a gate control algorithm 112. The processor 108 of the baler controller 106 is configured for executing the gate control algorithm 112. The gate control algorithm 112 implements a method of controlling the round baler 20.

Referring to FIG. 2, the method of controlling the round baler 20 includes forming crop material into the bale 56 within the baling chamber 54. As described above, the crop material is formed into the bale 56 by feeding the crop material through the inlet 50 and into the baling chamber 54, whereby the forming belts 64 move in the endless loop to roll the crop material in a spiral fashion into the bale 56 having the cylindrical shape. The forming belts 64 apply a constant pressure to the crop material as the crop material is formed into the bale 56. The belt tensioner 72 continuously moves one or more of the rollers 66, and thereby the forming belts 64, radially outward relative to the centerline 62 of the cylindrical bale 56 as the diameter of the bale 56 increases. The belt tensioner 72 maintains the appropriate tension in the belts to obtain the desired density of the crop material, Upon completion of the formation of the bale 56 within the baling chamber 54, and with the gate 36 in the closed position, the take-up roller 68 is positioned in a bale 56 formation position with the forming belts 64 generally drawn taut and exhibiting little or no slack therein.

Referring to FIG. 3, once the formation of the bale 56 within the baling chamber 54 is complete, the baler controller 106 moves the gate 36 of the round baler 20 relative to the housing 32 of the round baler 20 from the closed position into the intermediate position. The gate 36 may be moved in a suitable manner. For example, the baler controller 106 may control a valve to provide a hydraulic signal to the gate cylinders 80, thereby causing the gate cylinders 80 to extend and thereby move the gate 36 from the closed position into the intermediate position.

In order to calculate a weight of the bale 56, the baler controller 106 may pause movement of the gate 36 in the intermediate position. As described above, the first actuator 92 automatically applies the first bias force 94 to the take-up roller 68 to urge the take-up roller 68 into the slack take-up position as the gate 36 moves from the closed position to the intermediate position. When disposed in the slack take-up position, the take-up roller 68 increases the tension in the forming belts 64, which in turn reduces and/or eliminates slack in the forming belts 64. As such, when the take-up roller 68 is disposed in the slack take-up position, the forming belts 64 continue to move about the rollers 66 in the endless loop, which may cause the bale 56 to move relative to the gate 36. Additionally, with the take-up roller 68 disposed in the slack take-up position, tension in the forming belts 64 may further cause the bale 56 to move relative to the gate 36.

In order to prevent movement of the bale 56 relative to the gate 36 when the gate 36 is disposed in the intermediate position, to facilitate weighing of the bale 56, the baler controller 106 may control the second actuator 98 to provide the second bias force 100 to the take-up roller 68 to counteract the first bias force 94 from the first actuator 92. Selectively or actively controlling the second actuator 98 to counteract the first bias force 94 from the first actuator 92, which automatically urges the take-up roller 68 into the slack take-up position, maintains the take-up roller 68 in the bale 56 formation position, and/or applies a first amount of tension into the forming belt 64 when the gate 36 is disposed in the intermediate position.

The first amount of tension introduces a first mount of slack into the forming belt 64. The first amount of tension, and the corresponding first amount of slack introduced into the forming belt 64 by the first amount of tension, generates an amount of friction or a friction force between the drive roller 70 and the forming belt 64 that is insufficient to maintain movement of the forming belt 64 in the endless loop around the plurality of rollers 66. In other words, the friction between the drive roller 70 and the forming belts 64 is not sufficient to transmit motion from the drive roller 70 to the forming belts 64, thereby allowing or causing the forming belts 64 to slip relative to the drive roller 70 such that the forming belts 64 are not driven. Additionally, the slack introduced into the forming belt 64 by counteracting the first bias force 94 from the first actuator 92 with the second bias force 100 from the second actuator 98 reduces radial forces that the forming belts 64 may apply to the bale 56 that may urge the bale 56 out of the gate 36. As such, slack in the forming belts 64 prevents or reduce the tendency of the forming belts 64 to push the bale 56 out of the gate 36 when disposed in the intermediate position.

In order to counteract the first bias force 94 from the first actuator 92, when the gate 36 moves from the closed position into the intermediate position, the processor 108 executes the gate control algorithm 112 to control the second actuator 98. The second actuator 98 is controlled to generate the second bias force 100 to include a magnitude that is sufficient to overcome the first bias force 94 from the first actuator 92. The second bias force 100 from the second actuator 98 is applied for a period of time with the gate 36 disposed in the intermediate position to maintain the first amount of tension and the associated first amount of slack in the forming belt 64 for the period of time. The duration of the period of time may be dependent upon the time required to accurately sense the forces acting on the gate cylinders 80 needed to calculate the weight of the bale 56. As such, the baler controller 106 controls the second actuator 98 to maintain the second bias force 100 at the magnitude sufficient to overcome the first bias force 94 from the first actuator 92 for the period of time the gate 36 is disposed in the intermediate position.

Figure 4:
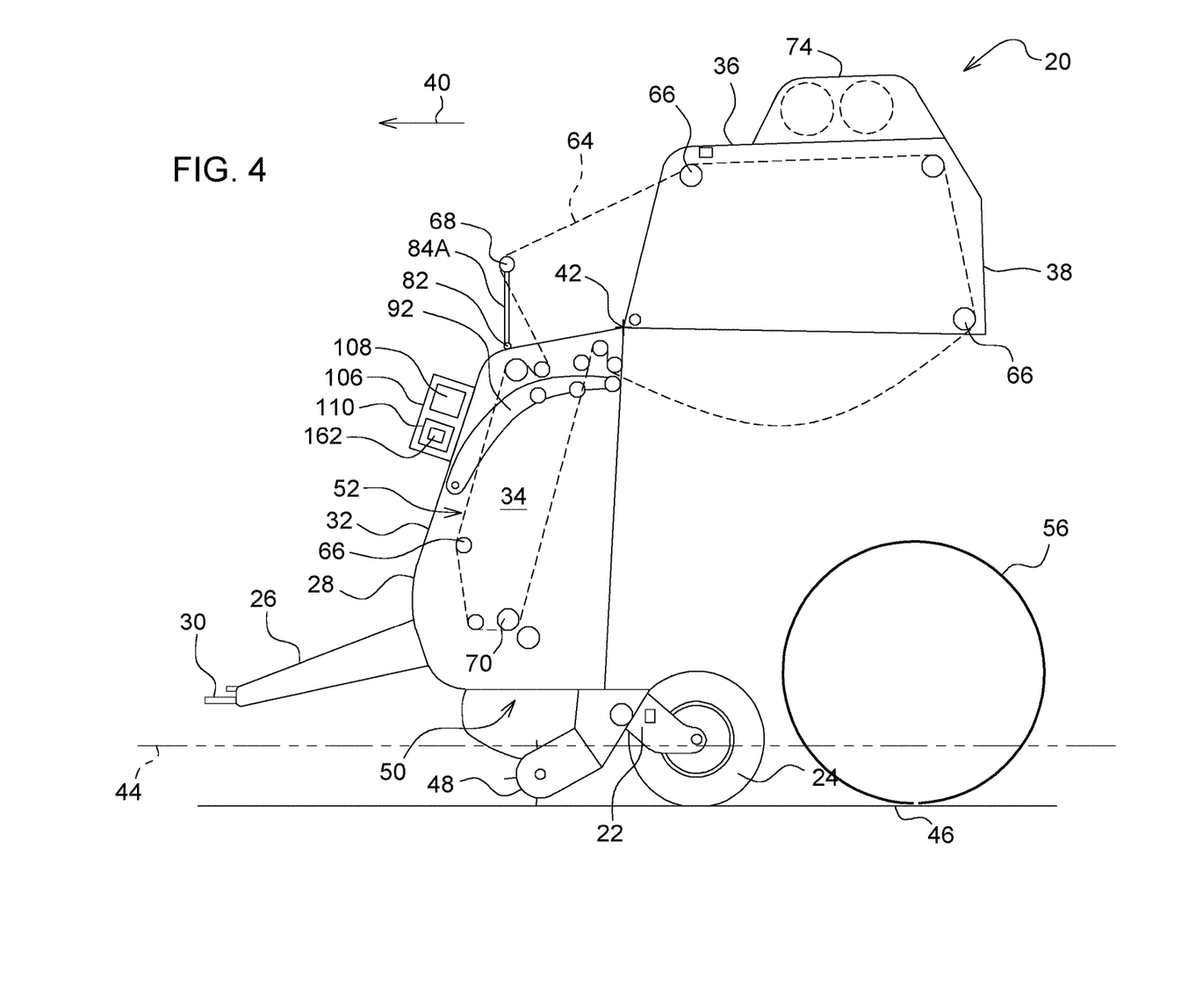
FIG. 4 is a schematic side view of the round baler showing the gate in an open position, the take-up roller in a slack take-up position, and the forming belt of the round baler exhibiting a second amount of slack.

Referring to FIG. 4, once the forces acting on the gate 36 sensor have been sensed and/or measured, i.e., after the period of time the gate 36 is maintained in the intermediate position, the baler controller 106 may move the gate 36 relative to the housing 32 from the intermediate position into the open position.

While the gate 36 is moving from the intermediate position into the open position, the baler controller 106 may control the second actuator 98 to allow the first bias force 94 from the first actuator 92 to move the take-up roller 68 into the slack take-up position, such that the forming belt 64 exhibits a second amount of tension that is less than the first amount of tension. The baler controller 106 may control the second actuator 98 to generate the second bias force 100 to include a magnitude that is less than the first bias force 94 from the first actuator 92 when the gate 36 moves between the intermediate position and the open position, so that the first bias force 94 from the first actuator 92 may move the take-up roller 68 into the slack take-up position.

The second amount of tension in the forming belts 64 generate a second amount of slack in the forming belts 64. The second amount of slack is less than the first amount of slack. In one implementation, the second amount of slack may be described as no slack with the forming belts 64 drawn taut. However, it should be appreciated that some amount of slack may be present in the forming belts 64 when exhibiting the second amount of slack in response to the second amount of tension.

The second amount of tension, and the corresponding second amount of slack in the forming belts 64 resulting therefrom, generates an amount of friction, i.e., a friction force, between the drive roller 70 and the forming belts 64 that is sufficient to maintain movement of the forming belt 64 in the endless loop around the plurality of rollers 66. In other words, the friction between the drive roller 70 and the forming belts 64 is sufficient to transmit motion from the drive roller 70 to the forming belts 64, thereby causing the forming belts 64 to move about the rollers 66 in the endless loop, such that the forming belts 64 are driven. Additionally, the second amount slack introduced into the forming belts 64 by the second amount of tension in the forming belts 64 increases radial forces that the forming belts 64 may apply to the bale 56 thereby urging the bale 56 out of the gate 36.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A round baler comprising:
 a housing;
 a gate rotatably attached to the housing for rotation about a gate rotation axis between a closed position and an open position;
 a forming belt defining a baling chamber and operable to form crop material into a bale having a cylindrical shape;
 a take-up roller moveably coupled to one of the gate or the housing and supporting the forming belt;
 a first actuator coupled to the take-up roller and operable to automatically apply a first bias force to the take-up roller to urge the take-up roller into a slack take-up position to reduce slack in the forming belt as the gate moves relative to the housing;
 a second actuator coupled to the take-up roller and operable to apply a second bias force to the take-up roller, wherein the second bias force is applied in opposition to the first bias force to control movement of the take-up roller as the gate moves relative to the housing; and
 a baler controller having a processor and a memory having a gate control algorithm saved thereon, wherein the processor is operable to execute the gate control algorithm to control the second actuator to act in opposition to the first actuator, when the gate moves from the closed position to an intermediate position disposed between the closed position and the open position, such that the forming belt exhibits a first amount of tension for a period of time while the gate is disposed in the intermediate position, whereby the forming belt does not rotate through an endless loop when the forming belt exhibits the first amount of tension.

2. The round baler set forth in claim 1, further comprising a take-up shaft defining a shaft axis and attached to the take-up roller, with the take-up roller rotatable with the take-up shaft about the shaft axis.

3. The round baler set forth in claim 2, further comprising a roller lever attached to and rotatable with the take-up shaft about the shaft axis and interconnecting the take-up shaft and the take-up roller.

4. The round baler set forth in claim 2, wherein the first actuator and the second actuator are coupled to the take-up shaft.

5. The round baler set forth in claim 4, further comprising an actuator lever interconnecting the take-up shaft and the first actuator.

6. The round baler set forth in claim 4, further comprising an actuator lever interconnecting the take-up shaft and the second actuator.

7. The round baler set forth in claim 1, wherein the first actuator includes a spring.

8. The round baler set forth in claim 7, wherein the first spring of the first actuator includes a coil spring.

9. The round baler set forth in claim 1, wherein the second actuator includes a linear actuator selectively controllable to extend and retract along a linear path.

10. The round baler set forth in claim 9, wherein the linear actuator of the second actuator is a hydraulic cylinder having a first end coupled to the take-up roller and a second end coupled to one of the housing or the gate.

11. The round baler set forth in claim 1, wherein the processor is operable to execute the gate control algorithm to control the second actuator to generate the second bias force to include a magnitude sufficient to overcome the first bias force from the first actuator when the gate moves between the closed position and the intermediate position.

12. The round baler set forth in claim 11, wherein the processor is operable to execute the gate control algorithm to control the second actuator to maintain the second bias force at the magnitude sufficient to overcome the first bias force from the first actuator for the period of time the gate is disposed in the intermediate position.

13. The round baler set forth in claim 1, wherein the processor is operable to execute the gate control algorithm to control the second actuator to allow the first bias force from the first actuator to move the take-up roller into the slack take-up position after the period to time, such that the forming belt exhibits a second amount of tension that is less than the first amount of tension.

14. The round baler set forth in claim 13, wherein the processor is operable to execute the gate control algorithm to control the second actuator to generate the second bias force to include a magnitude less than the first bias force from the first actuator when the gate moves between the intermediate position and the open position.

15. A method of controlling a round baler having a variable size baling chamber for forming a bale having a cylindrical shape, the method comprising:

forming crop material into a bale having a cylindrical shape with a forming belt circulating in an endless loop about a plurality of rollers, wherein at least one of the plurality of rollers is a take-up roller operable to decrease slack in the forming belt when a gate of the round baler is opened, and at least one of the plurality of rollers is a drive roller operable to drive the forming belt in the endless loop through frictional engagement between the forming belt and the drive roller;

moving the gate of the round baler relative to a housing of the round baler from a closed position into an intermediate position when formation of the bale is complete within the baling chamber; and counteracting a first bias force from a first actuator urging the take-up roller into a slack take-up position, with a second bias force from a second actuator, by controlling the second actuator with a baler controller to act in opposition to the first actuator to introduce a first amount of tension in the forming belt as the gate moves from the closed position into the intermediate position, such that the first amount of tension in the forming belt generates a friction force between the drive roller and the forming belt insufficient to maintain movement of the forming belt in the endless loop around the plurality of rollers whereby the forming belt does not rotate through the endless loop.

16. The method set forth in claim 15, further comprising maintaining the gate in the intermediate position with the first amount of tension in the forming belt for a period of time.

17. The method set forth in claim 16, further comprising moving the gate relative to the housing from the intermediate position into an open position after the period of time.

18. The method set forth in claim 16, further comprising reducing the second bias force from the second actuator with the baler controller to allow the first bias force from the first actuator to move the take-up roller into the slack take-up position after the period of time such that the forming belt exhibits a second amount of tension, wherein the second amount of tension in the forming belt generates a friction force between the drive roller and the forming belt sufficient to maintain movement of the forming belt in the endless loop around the plurality of rollers.

* * * * *